US011512150B2

United States Patent
Horemans

(10) Patent No.: US 11,512,150 B2
(45) Date of Patent: Nov. 29, 2022

(54) POLYMERIZATION PROCESS

(71) Applicant: INEOS USA LLC, League City, TX (US)

(72) Inventor: Theo Victor Horemans, Eindhout (BE)

(73) Assignee: INEOS USA LLC, League City, TX (US)

(*) Notice: Subject to any disclaimer, the term of this patent is extended or adjusted under 35 U.S.C. 154(b) by 71 days.

(21) Appl. No.: 17/099,919

(22) Filed: Nov. 17, 2020

(65) Prior Publication Data

US 2022/0153880 A1 May 19, 2022

(51) Int. Cl.
| | |
|---|---|
| *C08F 2/01* | (2006.01) |
| *C08F 2/14* | (2006.01) |
| *C08F 10/06* | (2006.01) |
| *B01J 8/18* | (2006.01) |
| *B01J 8/00* | (2006.01) |
| *B01J 8/36* | (2006.01) |

(52) U.S. Cl.
CPC ............ *C08F 2/01* (2013.01); *B01J 8/0015* (2013.01); *B01J 8/1872* (2013.01); *B01J 8/36* (2013.01); *C08F 2/14* (2013.01); *C08F 10/06* (2013.01); *C08F 2400/02* (2013.01)

(58) Field of Classification Search
USPC ............ 526/64, 919, 920; 366/173.1, 347; 422/131
See application file for complete search history.

(56) References Cited

U.S. PATENT DOCUMENTS

| | | | |
|---|---|---|---|
| 10,611,863 B2 * | 4/2020 | Gupta | ...................... B01J 4/008 |
| 2004/0116597 A1 | 6/2004 | Reid et al. | |
| 2005/0272891 A1 | 12/2005 | Fourage et al. | |
| 2014/0171602 A1 | 6/2014 | Bhandarkar et al. | |
| 2018/0319909 A1 | 11/2018 | Gupta et al. | |

FOREIGN PATENT DOCUMENTS

| | | | | |
|---|---|---|---|---|
| CN | 201372260 Y | | 3/2009 | |
| EP | 0776691 A1 | * | 6/1997 | ............... B01J 8/00 |
| EP | 1660231 B1 | | 4/2007 | |

OTHER PUBLICATIONS

Plug Flow Reactor (PFR): mass balance and reaction speed, pp. 1-3, retrieved online: http://myengineeringtools.com/Chemical_Reactions/Plug_Flow_Reactor_Mass_Balance.html (Undated).*

* cited by examiner

*Primary Examiner* — Fred M Teskin
(74) *Attorney, Agent, or Firm* — James J. Drake

(57) ABSTRACT

The present invention relates to a process for supply of a polymerization catalyst component to a polymerization reactor which comprises:

a. Providing a first stream comprising the catalyst component in a first line, which first line is connected to and downstream of a pump outlet or of a flow control valve, b. Providing a diluent stream in a second line, c. Contacting the first stream and the diluent stream to form a mixed stream and passing the mixed stream to a polymerization reactor, characterised in that the mixing of the first stream and the diluent stream takes place by providing the first stream from the first line and the diluent stream from the second line separately to a mixing chamber which has an enlarged cross-section compared to the first and second lines.

35 Claims, 1 Drawing Sheet

POLYMERIZATION PROCESS

BACKGROUND OF THE INVENTION

1. Technical Field

The present invention relates to a process for supply of a polymerization catalyst component to a polymerization reactor, and, in particular, in which a catalyst component is mixed with a diluent stream and passed to a polymerization reactor.

2. Description of the Prior Art

The catalytic polymerization of olefin monomers to produce polymers is well known and a number of processes are operated industrially, including in gas, solution and slurry phases. A catalyst or catalyst system typically comprises several catalyst components such as a transition metal containing catalyst (often referred to simply as a "procatalyst"), a metal alkyl cocatalyst or modifiers. In continuous commercial processes all catalyst components and monomer(s) are provided to a reactor.

Because of the relatively high productivity of modern polymerization catalysts it is not necessary, nor economic, to try to recover the catalyst components from the product, and so a continuous process must be supplied to replace the catalyst components withdrawn with the product, either continuously or discontinuously, with fresh catalyst components. Another result of the relatively high productivity of modern polymerization catalysts is that relatively small amounts of catalyst components need to be supplied.

Depending on the process the catalyst may be provided in supported or unsupported forms, and may be injected directly or mixed with other components of the reaction. In many instances it is advantageous to mix catalyst with a diluent liquid to form a slurry which is then passed to the reactor, not least because it is generally easier to control the addition of catalyst to the reactor by metering of a dilute catalyst slurry using a pump.

EP 1660231 relates to a process for preparing and supplying a catalyst slurry to a polymerization reactor in which polyethylene is prepared. The catalyst is initially in the form of a "concentrated" slurry and is diluted in an agitated mixing vessel to form a diluted catalyst slurry. This diluted slurry is then pumped to a reactor using a membrane pump.

The volume of the mixing vessel in EP 1660231 is relatively large, being sufficient to prepare a large batch of diluted catalyst slurry, including sufficient volume to fill a day tank whilst a new batch is prepared.

Whilst the system of EP 1660231 enables large batches of catalyst to be prepared and passed to a reactor it is necessary to carefully manage its inventory, both to ensure that a new batch of diluted catalyst is prepared before the old batch is all used, and also to ensure that not too much diluted catalyst is prepared prior to a change in catalyst, which might result in unused catalyst having to be dumped to prepare the batch of different catalyst. The process in EP 1660231 is also equipment "heavy", requiring a number of agitated vessels and interconnecting pipes, as well as both a pump for transferring the dilute slurry from the mixing vessel to the reactor and additional pumps or metering valves for transferring the concentrated slurry to the mixing vessel in the first place.

SUMMARY OF THE INVENTION

The present invention provides an improved process for preparing a diluted slurry containing a catalyst component which can be performed continuously in a relatively small chamber and which uses the flow of the diluent stream to provide adequate mixing as well as the transfer of the mixed stream to the downstream reactor.

Thus, in a first aspect, the present invention provides a process for supply of a polymerization catalyst component to a polymerization reactor which comprises:

a. providing a first stream comprising the catalyst component in a first line, which first line is connected to and downstream of a pump outlet or of a flow control valve, b. providing a diluent stream in a second line, c. contacting the first stream and the diluent stream to form a mixed stream and passing the mixed stream to a polymerization reactor, characterised in that the mixing of the first stream and the diluent stream takes place by providing the first stream from the first line and the diluent stream from the second line separately to a mixing chamber which has an enlarged cross-section compared to the first and second lines, and further characterised in that at least one of the following applies:

i) the volume of the mixing chamber is such that the residence time, based on the total volumetric flow rate of the mixed stream, is less than 5 seconds, ii) the volume of the mixing chamber is less than 150 cm$^3$, iii) the mixing chamber is not mechanically agitated, iv) the mixing chamber has a cover which can be removed to allow cleaning of the mixing chamber in situ.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE PREFERRED EMBODIMENT(S)

Figure 1:
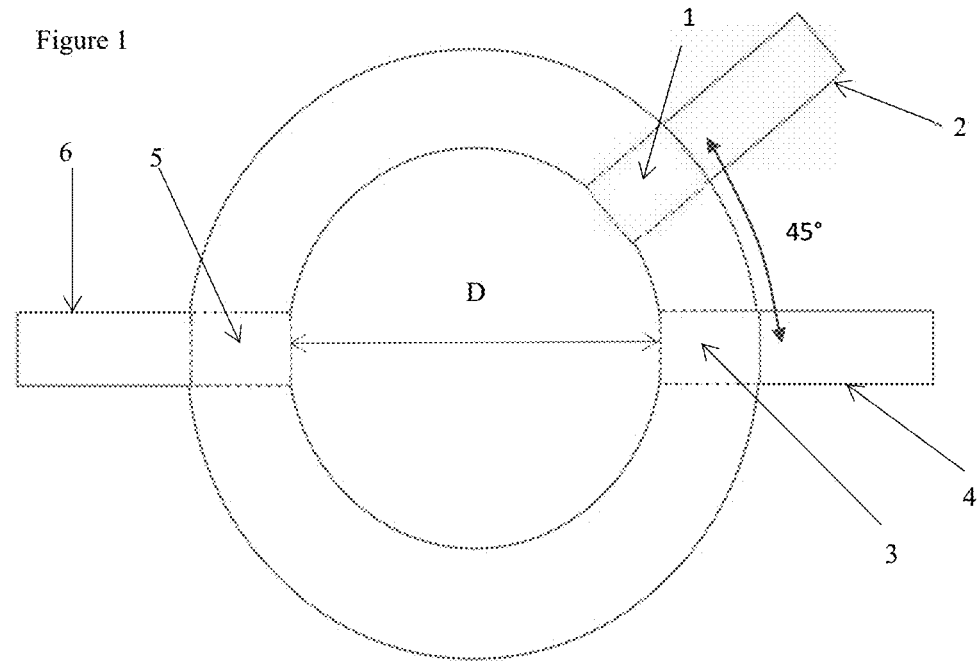
FIG. 1 shows in schematic form a top view of a cylindrical mixing chamber.

The present invention provides a process for supply of a polymerization catalyst component to a polymerization reactor. Typical catalyst components, although dependent on the specific catalyst, are well known in the art. For avoidance of doubt, however, it is noted that, in general, the term "catalyst component" encompasses the following:

i) A polymerization catalyst which is active and can be used in the absence of any other catalyst components (i.e. the catalyst is the catalyst component), ii) All components in a polymerization catalyst which comprises a procatalyst component (hereinafter "procatalyst") and a cocatalyst component (hereinafter "cocatalyst") where the latter is required to provide suitable catalytic activity to the procatalyst component, and, iii) Any catalyst modifier component (hereinafter "modifier") which might be used with the catalysts in (i) or (ii).

The prior art may sometimes use the term "catalyst" to refer to a catalyst according to (i) above but also to refer to "procatalysts" according to (ii) above. Nevertheless, despite the different terminology which may be used, examples of both "types" of polymerization catalyst, and therefore what constitute catalyst components in the present invention, are well-known in the art. Further, and again for avoidance of any doubt, either of the above "types" of catalyst (i) and (ii) may be used with other catalyst components. For example, either type may be used with modifiers according to (iii), and those of type (i), even if not necessary, may also still be used with a cocatalyst component. (Some examples of different components are discussed further below.)

More generally, the specific features of the catalyst component in the first stream of the present invention are less critical than the manner in which it is mixed with a diluent stream in a mixing chamber. In particular, it is a feature of the present invention is that at least one of the features (i) to (iv) applies. Preferably, at least two of features (i) to (iv) apply, such as at least 3 of them, and most preferably all of them apply.

Options (i) and (ii) relate, either directly or indirectly, to the size of the mixing chamber.

In particular it is preferred that the mixing chamber is relatively small, which can be defined either in absolute terms, as in option (ii), or by the residence time of the mixed stream, as in option (i).

In relation to the absolute volume, the mixing chamber preferably has a total volume of less than 120 $cm^3$, such as less than 100 $cm^3$. The volume is preferably at least 5 $cm^3$. In particularly preferred embodiments the volume is from 25 to 75 $cm^3$, such as 30 to 60 $cm^3$.

In relation to the residence time, this is defined herein based on the total volumetric flow rate of the mixed stream, which means the residence time equals the volume of the mixing chamber divided by the volumetric flow rate of the mixed stream. This is preferably less than 4 seconds, such as less than 2 seconds, and even more preferably less than 1 second. The residence time is generally at least 0.05 seconds, and most preferably is in the range 0.1 seconds to 0.5 seconds.

The mixing chamber has an enlarged cross-section compared to the first and second lines. In preferred embodiments the mixing chamber has a cylindrical cross-section, preferably with an internal diameter 2 to 10 times the internal diameter of the first line. The cylindrical cross-section may have a length to diameter ratio of 0.5 to 10.

Where the mixing chamber has a cylindrical cross-section it may comprise a first inlet for the first stream from the first line which is on the side of the cylinder and a second inlet for the diluent stream from the second line which is on the side of the cylinder at an angle of from 15° to 90°, and preferably from 45 to 90° from the first inlet. The mixing chamber is also provided with an outlet by which the mixed stream exits the mixing chamber for passage to the polymerization reactor, and preferably the outlet is on the opposite side of the cylinder to the first inlet (i.e. at an angle of at least 90° from the first inlet in either direction), and preferably at an angle of at least 90° from the first inlet in the opposite direction to the second inlet. (Such that the outlet is at least 105°, preferably at least 135° from the second inlet.) Preferably, the outlet is from 135 to 225° degrees from the first inlet.

This configuration provides the most efficient mixing of the first stream and the diluent stream, as well as allowing the most efficient use of the momentum in the incoming diluent stream to provide the mixing as well as the transfer of the mixed stream to the downstream reactor.

Either stream, but in particular the diluent stream, may optionally enter the mixing chamber tangentially to enhance the mixing.

The mixed stream is passed from the mixing chamber to a polymerization reactor preferably without any additional pumping or metering means being present in the flow path between the two. Most preferably the mixing chamber is connected to the reactor by a pipe without any intermediate pumps, vessels or other mixing means.

The mixing chamber may be provided with internals which aid the mixing. However, it is preferred that no mechanical agitation is provided in the mixing chamber, by which is meant no stirrer or other agitator which is required to be powered by a motor, is present. Most preferably no internals to aid the mixing are provided.

In feature (iv) of the present invention the mixing chamber is provided with a cover which can be removed to allow cleaning of the mixing chamber in situ. In particular, some polymerization catalyst components can react with impurities in the diluent stream to produce deposits. For example, Ziegler-Natta procatalysts can react with residual moisture to precipitate a sticky titanium containing deposit while aluminium alkyl cocatalysts, such as triethylaluminium, can react with moisture to form aluminium hydroxide precipitates. Whilst most diluents have a strict specification which defines a maximum moisture content, even trace quantities (less than 1 ppm) of water can lead to the slow build-up of deposits over time.

The mixing of the first stream and the diluent stream in the present invention takes place by providing the first stream from the first line and the diluent stream from the second line separately to a mixing chamber which has an enlarged cross-section compared to the first. The separate provision of these two streams ensures mixing occurs in the mixing chamber rather than in a narrower line upstream, whilst the enlarged cross-section of the mixing chamber allows deposits to build-up somewhat without the chamber becoming blocked. This increases the time required before the mixing system must be cleaned.

Nevertheless, the mixing chamber can still need to be cleaned periodically. The provision of a cover which can be removed to allow cleaning of the mixing chamber in situ then enables this cleaning to take place without physically disconnecting the mixing chamber from the upstream (first and second) and downstream (line to the reactor) lines. ("In-situ" being used in this context to mean that that the mixing chamber can be cleaned without being moved and without disconnecting the mixing chamber from the upstream and downstream lines. Typically, the mixing chamber is isolated from the first line, the second line and the downstream system to the polymerization reactor, so that flow cannot occur, and then the cover can be removed.)

Whilst this is preferred, nevertheless as an alternative the mixing chamber may be designed to be isolated from the system and physically removed for cleaning off-line or simply replaced with a new mixing chamber which can be connected to the first line, second line and downstream system.

Preferably, the first line is connected to and downstream of a pump outlet. The use of a pump rather than a control valve generally provides a more accurate and reliable flow of the first stream. Preferred pumps for pumping the first stream, particularly when it comprises a catalyst or procatalyst slurry, are progressive cavity pumps. Membrane pumps can also be used.

In a preferred embodiment of the present invention, particularly when the first stream comprises a catalyst component which comprises particles, such as a supported procatalyst, the mixing chamber forms a low point for the first stream in the first line. As used herein this means that, in the event that the pump for the first line fails or flow to the first line is otherwise stopped, then under the influence of gravity, any particles in the first line will collect in the mixing chamber. This empties the first line of solids, between the pump outlet or control valve and the mixing chamber, which prevents the solids from settling in, and potentially plugging, the first line. It will be apparent that this is particularly relevant where the first stream is a slurry of catalyst or procatalyst particles, which is a preferred embodiment described further below.

The enlarged volume of the mixing chamber generally reduces the risk that the settled particles will plug the chamber. Even if it does plug however the provision of a removable cover enables this part of the mixing system to be cleaned without being disconnected.

In a preferred embodiment, there may be provided two (or more) parallel sets of first line, second line and mixing chamber connecting to the polymerization reactor, such that one mixing chamber can be cleaned whilst continuing to feed catalyst component to the reactor via a second mixing chamber. This enables the polymerization reaction to be operated even when one mixing chamber is being cleaned, which enables continuous operation.

The process of the present invention may be applied in any suitable polymerization process in which a polymerization catalyst component is to be diluted in a diluent stream prior to passage to the reactor.

In one embodiment the polymerization reactor may be a slurry phase polymerization reactor. Such reactors are well known and, for example, include slurry stirred tank reactors and slurry loop reactors.

In another embodiment the polymerization reactor may be a gas phase polymerization reactor, such as a gas phase fluidised bed polymerization reactor, such as a vertically orientated fluidised bed reactor, or a gas phase polymerization reactor which in use contains a sub-fluidized particulate bed of polymer, such as a vertical stirred bed polymerization reactor or a horizontal stirred bed polymerization reactor.

Preferably, the polymerization reactor is a reactor for the polymerization of ethylene and/or propylene, and especially for polymerization of propylene. A particularly preferred polymerization reactor to which the process can be applied is a propylene polymerization reactor, especially a vertical or horizontal stirred bed propylene polymerization reactor.

The first stream comprises a catalyst component. As already noted, a polymerization catalyst may comprise several catalyst components such as a transition metal containing procatalyst, a cocatalyst or a modifier.

Examples of suitable catalysts known in the art are Ziegler-Natta, metallocene and chromium catalysts. Ziegler-Natta catalysts typically contain a transition metal compound such titanium halides and a Group 2 metal compound such as magnesium chloride. The Ziegler-Natta catalyst may also include an inert support material such as metal oxides or alumina metalloid oxides, e.g. alumina or silica. Metallocene catalysts are typically silica/MAO supported transition metal metallocene complexes. Chromium catalysts are typically silica supported chromium compounds activated at elevated temperatures to yield silica-supported chromium oxide compounds.

Procatalysts for the above catalysts may use a cocatalyst to become catalytically active. Cocatalysts may also be used to enhance catalyst performance. Cocatalysts are typically selected from Group 3 metal alkyls, preferably boron or aluminium alkyls. Examples of suitable aluminium alkyls include trialkylaluminium, dialkylaluminium hydride, alkylaluminium dihydride, dialkylaluminium halide, alkylaluminium dihalide, dialkylaluminium alkoxide, e.g. triethylaluminium (TEAL) or diethylaluminium dichloride (DEAC). Examples of suitable boron alkyls include trialkylboron, e.g. trimethylboron (TEB).

As also noted previously, the catalyst may also include a modifier. As defined herein a "modifier" is a compound added in addition to any cocatalyst and which modifies the catalyst performance and/or polymer properties. Preferably the modifier contains at least one functional group that is capable of donating electrons to a metal atom of the catalyst or procatalyst. As defined herein a "functional group" is a group contain at least one heteroatom such as oxygen, sulphur, nitrogen, phosphorous and the like, capable of donating electrons to a metal atom. Most preferably, the functional group is an ether, ester, amine, amide or phosphine group. Examples of modifiers are selectivity control agents, which modify the catalyst stereoselectivity in the polymerization of □-olefins, and activity control agents, which modify the catalyst activity Examples of selectivity controls agents are alkoxysilane or diether compositions. The alkoxysilanes have the general formula: $SiR_m(OR')_{4-m}$ where R independently each occurrence is a hydrocarbyl or an amino group optionally substituted with one or more substituents containing one or more Group 14, 15, 16, or 17 heteroatoms. R contains up to 20 atoms not counting hydrogen and halogen, R' is a C1-20 alkyl group, and m is 0, 1, 2 or 3. In an embodiment, R is C6-12 aryl or aralkyl, C1-20 alkyl, C3-12 cycloallyl, C3-12 branched alkyl, or C3-12 cyclic amino group, R' is C1-4 alkyl, and m is 1 or 2. Examples of suitable alkoxysilanes include dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the alkoxysilane may be dicyclopentyldimethoxysilane, methylcyclohexyldimethoxysilane, n-propyltrimethoxysilane, or any combination of thereof. In a further embodiment, the alkoxysilanes composition includes two or more of the foregoing alkoxysilanes.

The diethers have the general formula: $RR'C(CH_2—CH_2OR'')_2$ where R, R' and R" independently each occurrence is a C1-20 alkyl group, optionally substituted with one or more substituents containing one or more heteroatoms. Examples of suitable diethers are 2,2-diisobutyl-1,3-dimethoxypropane, 2-isobutyl-2-isopropyl-1,3-dimethoxypropane, or 2.2-dicyclopentyl-1,3-dimethoxypropane.

Examples of activity control agents are carboxylic acid esters, poly(alkene glycols), poly(alkene glycol) esters, and polymeric or oligomeric compounds that contain more than one ether group.

The carboxylic acid ester, when used, may be an aromatic mono- or poly-carboxylic acid ester or an aliphatic acid ester.

Examples of suitable aromatic carboxylic acids include C1-10 alkyl or cycloalkyl esters of aromatic monocarboxylic acids. Suitable substituted derivatives thereof include compounds substituted both on the aromatic ring(s) or the ester group with one or more substituents containing one or more Group 14, 15, 16 or 17 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a C1-20 hydrocarbyl ester of benzoic acid wherein the hydrocarbyl group is unsubstituted or substituted with one or more Group 14, 15, 16 or 17 heteroatoms containing substituents and C1-20 (poly)hydrocarbyl ether derivatives thereof, or C1-4 alkyl benzoates and C1-4 ring alkylated derivatives thereof, or methyl benzoate, ethyl benzoate, n-propyl benzoate, methyl p-methoxybenzoate, methyl p-ethoxybenzoate, ethyl p-methoxybenzoate, and ethyl p-ethoxybenzoate. In an embodiment, the aromatic monocarboxylic acid is ethyl p-ethoxybenzoate.

The activity control agent may be an aliphatic acid ester. The aliphatic acid ester may be a fatty acid ester, may be a C4-C30 aliphatic acid ester, may be a mono- or a poly- (two or more) ester, may be straight chain or branched, may be saturated or unsaturated, and any combination thereof. The C4-C30 aliphatic acid ester may also be substituted with one or more Group 14, 15, or 16 or 17 heteroatom containing substituents. Examples of suitable C4-C30 aliphatic acid esters include C1-20 alkyl esters of aliphatic C4-30 monocarboxylic acids, C1-20 alkyl esters of aliphatic C8-20 monocarboxylic acids. C1-4 allyl mono- and diesters of aliphatic C4-20 monocarboxylic acids and dicarboxylic acids, C1-4 alkyl esters of aliphatic C8-20 monocarboxylic acids and dicarboxylic acids, and C4-20 alkyl mono- or polycarboxylate derivatives of C2-100 (poly)glycols or C2-100 (poly)glycol ethers. In a further embodiment, the C4-C30 aliphatic ester may be isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, (poly)(alkylene glycol) mono- or di-stearates, glyceryl tri(acetate), glyceryl tri-ester of C2-40 aliphatic carboxylic acids, and mixtures thereof.

Where the first stream comprises a catalyst component which is a liquid then the catalyst component may be used "neat" or in the form of a solution in a diluent as the first stream. This diluent, when used, may be the same or different in composition to the diluent stream used in step (b). The diluent in such a solution is preferably a component, such as monomer or inert diluent, which is already used in the polymerization process. Examples are isobutane for slurry loop ethylene polymerization processes, and propylene for bulk propylene polymerization processes, as described further in respect of the diluent stream below.

Even if already provided in the form of a solution in a diluent the first stream in step (a) in this embodiment may be considered as "concentrated", whilst after mixing with the diluent stream it may be considered as "diluted". (In this context "concentrated" typically means a concentration of the catalyst component in the first stream of at least 5 wt %, and preferably at least 10 wt %. The concentration may be up to and including 100% (if the catalyst component is used "neat".))

In a most preferred embodiment the first stream comprises a procatalyst, and most preferably comprises a procatalyst slurry.

The procatalyst in this embodiment may be any of the procatalysts typically used for such polymerization reactions, including Ziegler-Natta, chromium and metallocene procatalysts. The procatalyst is preferably a Ziegler-Natta procatalyst.

The procatalyst slurry as provided in step (a) in this embodiment generally comprises procatalyst particles suspended in a carrier liquid. This carrier liquid may be the same or different in composition to the diluent stream used in step (b).

It should also be noted, and should be clear from some of the examples below, that the "carrier liquid" can comprise mixtures of diluent compounds, and the term "carrier liquid" is used to encompass such mixtures as well as individual compounds. (And for avoidance of doubt this also applies to the diluent in the first stream when the first stream comprises a catalyst component in the form of a solution in a diluent.) The procatalyst slurry as provided in step (a) in this embodiment may be considered as "concentrated". In the present invention this means that it may have a procatalyst concentration in the carrier liquid of at least 5 wt %, and preferably at least 10 wt %, with 10-40 wt % being typical. The carrier liquid is preferably an inert diluent. Examples of typical inert diluents include mineral oil, but any inert diluent, especially an alkane or a mixture of alkanes, can be used as the carrier liquid.

(For avoidance of doubt the term "inert diluent" as used herein may refer to an individual inert compound or a mixture of inert compounds in a similar manner that the term "carrier liquid" is used to encompass mixtures as well as individual compounds. According to the present invention compounds are considered inert if they do not react with the procatalyst in the polymerization reactor.)

In general terms, polymerization procatalysts can be supplied in solid (dry) form. If this is the case then the procatalyst slurry used in step (a) of this embodiment may then have been prepared from a solid procatalyst by addition of the carrier liquid to form a slurry suitable for further dilution according to the present invention.

Alternatively procatalysts can be supplied in slurry form, for example in mineral oil, in which case this procatalyst slurry may be used in step (a) "as supplied" or may be "pre-diluted" to form the first stream prior to its further dilution according to the present invention. (In the latter case the carrier liquid is then a mixture of the liquid in the supplied procatalyst slurry and that used for the pre-dilution.)

More generally, any upstream mixing of a catalyst component (such as procatalyst) and whether initially solid or liquid/slurry with liquid carrier or with diluent to form the first stream may have been performed, for example, by dilution in an upstream mixing tank. Carrier liquids and diluents suitable for any such steps will generally be dependent on the polymerization process, and may be the same as the diluent stream provided in step (b) of the present invention, examples of which are described below, or may be different.

It is preferably the case however that any diluent/carrier liquid in the first stream as provided in step (a) is an inert diluent, whereas the diluent stream used in step (b) can be an inert diluent but can also comprise or consist of monomer as will be discussed further below.

The diluent stream provided in the second line will be selected depending on the polymerization process and also dependent on the catalyst component in the first stream. It may be the same as any diluent/carrier liquid present in the first stream prior to mixing. However, where the first stream comprises a slurry of catalyst or procatalyst in a carrier liquid, the diluent stream usually differs from the carrier liquid.

In some embodiments, the diluent stream may be an inert diluent. The diluent stream may be one or more C2 to C6 alkanes. For example, for slurry polymerization of ethylene in a loop reactor the diluent stream will preferably be inert diluent used in the reaction, which is most commonly isobutane. For gas phase polymerization of ethylene in a fluidised bed polymerization reactor the diluent stream may be an inert hydrocarbon also used as condensing agent in the reactor, such as one or more pentanes. In propylene polymerization processes it is possible to use either an inert diluent, such as propane, or the monomer itself as diluent.

In preferred embodiments the diluent stream comprises monomer to be polymerized in the polymerization reactor. In particularly preferred embodiments of the present invention the diluent stream in the second line comprises propylene, and more preferably is propylene. Generally, but in particular where the first stream comprises procatalyst, the diluent stream preferably is propylene which has not previously been in contact with aluminium alkyl compounds, such as fresh (polymer grade) propylene. (By "fresh" is meant propylene which is being passed to the polymerization reactor (via the claimed process) for the first time, and which can be contrasted with recycled propylene which has been recovered from downstream processing.)

The relative mass flow rates of the first stream and the diluent stream will be selected based on the concentration of catalyst component required in the mixed stream, which itself will depend on the concentration of the catalyst component in the first stream prior to mixing. However, the mass flow rate of the diluent stream is preferably significantly in excess of that of the first stream in the first line, such as at least 5 times the mass flow rate of the first stream in the first line.

In relation to the first stream comprising a catalyst or procatalyst slurry the mass flow rate of the diluent stream is preferably at least 10 times the mass flow rate of the first stream (catalyst/procatalyst slurry) in the first line. A preferred ratio, for example when using propylene as the diluent, is a mass flow rate of the diluent stream in the second line of 20 to 1000 times the mass flow rate of the slurry in the first line. In particular, where the diluent stream comprises a reactant in the subsequent polymerization reactor then there is no particular concern from feeding large quantities of the diluent stream and large relative flows of the diluent stream can therefore be used. In fact, a large quantity of diluent is preferred, because it reduces the residence time of the catalyst or procatalyst in the transfer line to the reactor and improves process control. Especially in this embodiment, but also more generally, preferably the residence time between the mixing chamber and the reactor is less than 20 seconds.

It is possible, but not necessary, to provide external heating or cooling to the mixing process/mixed stream (for example by heating or cooling of the first stream, the diluent stream and/or the mixing chamber, or the transfer line to the reactor). In one embodiment the mixing may take place at below ambient temperature, for example by use of one or more of cooling applied to the first or second lines or to the mixing chamber, or, preferably, by provision of a previously cooled diluent stream. This can reduce reaction of a procatalyst with monomer, such as propylene, when used or a catalyst component with any moisture present in the diluent stream. However, the residence time in the present invention is preferably minimised and/or, when the first stream comprises procatalyst, the diluent stream in the second line does not comprises propylene which has previously been in contact with aluminium alkyl compounds, to avoid the need for cooling.

Mixing preferably takes place at or close to ambient temperature, such as in the range 5 to 35° C.

In a further embodiment the present invention provides an apparatus for use in the process described above.

Hence, the present invention also provides an apparatus for supply of a polymerization catalyst component to a polymerization reactor, which apparatus comprises:
 a. a first line for a first stream which comprises the catalyst component, which first line is connected to and downstream of a pump outlet or of a flow control valve,
 b. a second line for a diluent stream,
 c. a mixing chamber configured for contacting of first stream in the first line and diluent stream in the second line to form a mixed stream, and
 d. a transfer line for passing the mixed stream to a polymerization reactor, characterised in that the first line and the second line connect separately to the mixing chamber and that the mixing chamber has an enlarged cross-section compared to the first and second lines, and further characterised in that at least one of the following applies:
  i) the volume of the mixing chamber is such that the residence time, based on the total volumetric flow rate of the mixed stream, is less than 5 seconds,
  ii) the volume of the mixing chamber is less than 150 ml,
  iii) the mixing chamber is not mechanically agitated,
  iv) the mixing chamber has a cover which can be removed to allow cleaning of the mixing chamber in situ.

EXAMPLES

Figure 2:
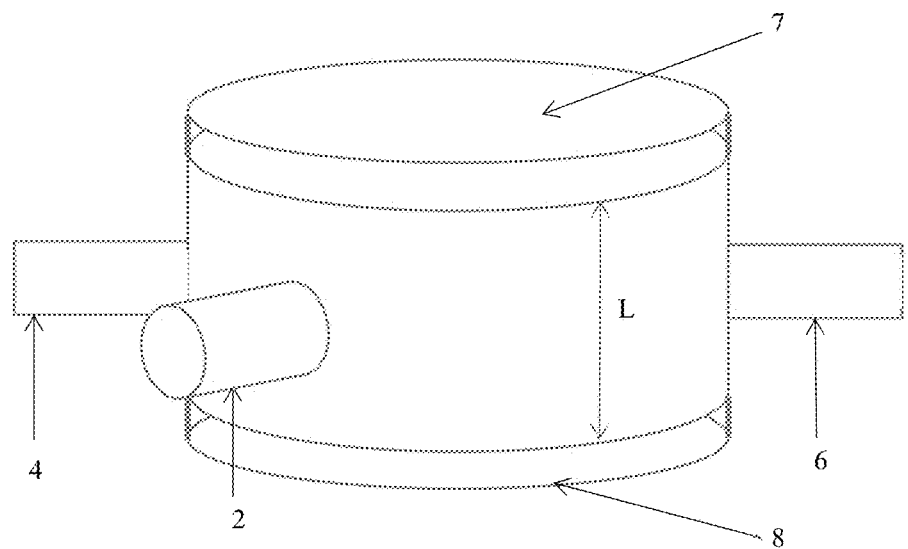
FIG. 2 shows in schematic form a side view of the same mixing chamber.

The present invention will now be illustrated with respect to the Figures and the following Example in which a procatalyst slurry is mixed with propylene, wherein:
FIG. 1 shows in schematic form a top view of a cylindrical mixing chamber, and
FIG. 2 shows in schematic form a side view of the same mixing chamber As shown in FIGS. 1 and 2, the mixing chamber comprises a first inlet (1) for a first line (2), a second inlet (3) for a second line (4), and an outlet (5) with a line (6) to a polymerization reactor (not shown). The second inlet is at an angle of 45° from the first inlet, and the outlet is on the opposite side of the cylinder to the first inlet at an angle of 135° therefrom. The mixing chamber has a diameter, D, and a length, L, giving a total volume, V. No internals or mechanical agitation are provided.

As shown schematically in FIG. 2, removable covers (7, 8) are provided on either side of the chamber to enable cleaning.

Example 1

This Example describes the supply of a concentrated Ziegler-Natta catalyst to a propylene polymerization process, using fresh polymer grade propylene as the diluent stream.

The mixing chamber is as shown in FIGS. 1 and 2, having a diameter of 44 mm and a length of 30 mm, giving a total volume of 45.6 cm$^3$. The lines 2, 4 and 6 each have an internal diameter of 13.9 mm, which corresponds to a 15 mm Schedule 80 pipe.

Concentrated Ziegler-Natta procatalyst slurry with a concentration of 30 wt % in mineral oil is passed through line (2) and inlet (1) at a mass flow rate of 1 g/s. Polymer grade propylene is passed though second line (4) and inlet (3) at a mass flow rate of 114 g/s. The total flow rate is 115 g/s.

The density of the mixed stream is 0.47 g/cm$^3$, giving a volumetric flow rate of about 240 cm$^3$/s, and a residence time of 0.19 seconds.

The process is operated over a year with the same flow of propylene in the second line, but the mass flow rate of procatalyst was varied as required for the polymer grade being produced between 0.14 and 1.7 g/s.

The process was operated successfully without blocking of the mixing chamber.

Example 2 (Comparative)

This example describes the supply of a concentrated Ziegler-Natta procatalyst to a propylene polymerization process, using fresh polymer grade propylene as the diluent stream, but without a mixing chamber.

Concentrated Ziegler-Natta procatalyst slurry with a concentration of 30 wt % in mineral oil is passed through stainless steel tubing with an ID of 9.5 mm at a mass flow rate of approximately 1 g/s. Polymer grade propylene is added from the top through a 90 degree tee at a mass flow rate of 114 g/s for a total flow rate of 115 g/s.

Trace moisture in the polymer grade propylene reacted with the procatalyst to form sticky residues that collected and slowly built up at the mixing point. In 6-9 months, this residue sufficiently restricted the outlet so that the desired flow rate of diluent could not be added with the allowable pressure drop of the feed system. This required that the tee and a small portion of the downstream tubing be replaced to return the procatalyst feed system to normal service.

What is claimed is:

1. A process for supply of a polymerization catalyst component to a polymerization reactor which comprises:
   a. Providing a first stream comprising the catalyst component in a first line, which first line is connected to and downstream of a pump outlet or of a flow control valve,
   b. Providing a diluent stream in a second line,
   c. Contacting the first stream and the diluent stream to form a mixed stream and passing the mixed stream to a polymerization reactor,
   characterised in that the mixing of the first stream and the diluent stream takes place by providing the first stream from the first line and the diluent stream from the second line separately to a mixing chamber which has an enlarged cross-section compared to the first and second lines, and further characterised in that at least one of the following applies:
   i) the volume of the mixing chamber is such that the residence time, based on the total volumetric flow rate of the mixed stream, is less than 5 seconds,
   ii) the volume of the mixing chamber is less than 150 ml,
   iii) the mixing chamber is not mechanically agitated,
   iv) the mixing chamber has a cover which can be removed to allow cleaning of the mixing chamber in situ,
   and further wherein the mixing chamber has a cylindrical cross-section and comprises a first inlet for the first stream from the first line and which is on the side of the cylinder, a second inlet for the diluent stream from the second line which is on the side of the cylinder at an angle of from 15 to 90° from the first inlet, and an outlet by which the mixed stream exits the mixing chamber for passage to the polymerization reactor, wherein the outlet is on the opposite side of the cylinder to the first inlet at an angle of from 135 to 225° degrees therefrom.

2. A process according to claim 1 wherein the mixing chamber has a cover which can be removed to allow cleaning of the mixing chamber in situ.

3. A process according to claim 1 wherein the first line is connected to and downstream of a pump outlet.

4. A process according to claim 1 wherein the mixing chamber forms a low point for the first stream in the first line.

5. A process according to claim 1 wherein the mixing chamber has a cylindrical cross-section with an internal diameter 2 to 10 times the internal diameter of the first line.

6. A process according to claim 1 wherein the mixing chamber has a cylindrical cross-section with a length to diameter ratio of 0.5 to 10.

7. A process according to claim 1 wherein the mass flow rate of the diluent stream in the second line is 20 to 1000 times the mass flow rate of the first stream in the first line.

8. A process according to claim 1 wherein there are provided two or more parallel sets of first line, second line and mixing chamber connecting to the polymerization reactor, such that one mixing chamber can be cleaned whilst continuing to feed catalyst component to the reactor via the second mixing chamber.

9. A process according to claim 1 wherein the first stream comprises a slurry of a polymerization procatalyst.

10. A process according to claim 1 wherein the polymerization reactor is a horizontal stirred bed propylene polymerization reactor.

11. An apparatus for supply of a polymerization catalyst component to a polymerization reactor, which apparatus comprises:
   a. a first line for a first stream which comprises the catalyst component, which first line is connected to and downstream of a pump outlet or of a flow control valve,
   b. a second line for a diluent stream,
   c. a mixing chamber configured for contacting of first stream in the first line and diluent stream in the second line to form a mixed stream, and
   d. a transfer line for passing the mixed stream to a polymerization reactor, characterised in that the first line and the second line connect separately to the mixing chamber and that the mixing chamber has an enlarged cross-section compared to the first and second lines, and further characterised in that at least one of the following applies:
   i) the volume of the mixing chamber is such that the residence time, based on the total volumetric flow rate of the mixed stream, is less than 5 seconds,
   ii) the volume of the mixing chamber is less than 150 ml,
   iii) the mixing chamber is not mechanically agitated,
   iv) the mixing chamber has a cover which can be removed to allow cleaning of the mixing chamber in situ,
   and further wherein the mixing chamber has a cylindrical cross-section and comprises a first inlet for the first stream from the first line and which is on the side of the cylinder, a second inlet for the diluent stream from the second line which is on the side of the cylinder at an angle of from 15 to 90° from the first inlet, and an outlet by which the mixed stream exits the mixing chamber for passage to the polymerization reactor, wherein the outlet is on the opposite side of the cylinder to the first inlet at an angle of from 135 to 225° degrees therefrom.

12. A process for supply of a polymerization catalyst component to a polymerization reactor which comprises:
   a. Providing a first stream comprising the catalyst component in a first line, which first line is connected to and downstream of a pump outlet or of a flow control valve,
   b. Providing a diluent stream in a second line, c. Contacting the first stream and the diluent stream to form a mixed stream and passing the mixed stream to a polymerization reactor, characterised in that the mixing of the first stream and the diluent stream takes place by providing the first stream from the first line and the diluent stream from the second line separately to a mixing chamber which has an enlarged cross-section compared to the first and second lines, and further characterised in that at least one of the following applies:

i) the volume of the mixing chamber is such that the residence time, based on the total volumetric flow rate of the mixed stream, is less than 5 seconds, ii) the volume of the mixing chamber is less than 150 ml, iii) the mixing chamber is not mechanically agitated, iv) the mixing chamber has a cover which can be removed to allow cleaning of the mixing chamber in situ, and wherein the mixing chamber has a cover which can be removed to allow cleaning of the mixing chamber in situ.

13. A process according to claim 12 wherein the first line is connected to and downstream of a pump outlet.

14. A process according to claim 12 wherein the mixing chamber forms a low point for the first stream in the first line.

15. A process according to claim 12 wherein the mixing chamber has a cylindrical cross-section with an internal diameter 2 to 10 times the internal diameter of the first line.

16. A process according to claim 12 wherein the mixing chamber has a cylindrical cross-section with a length to diameter ratio of 0.5 to 10.

17. A process according to claim 12 wherein the mass flow rate of the diluent stream in the second line is 20 to 1000 times the mass flow rate of the first stream in the first line.

18. A process according to claim 12 wherein there are provided two or more parallel sets of first line, second line and mixing chamber connecting to the polymerization reactor, such that one mixing chamber can be cleaned whilst continuing to feed catalyst component to the reactor via the second mixing chamber.

19. A process according to claim 12 wherein the first stream comprises a slurry of a polymerization procatalyst.

20. A process according to claim 12 wherein the polymerization reactor is a horizontal stirred bed propylene polymerization reactor.

21. A process for supply of a polymerization catalyst component to a polymerization reactor which comprises:

a. Providing a first stream comprising the catalyst component in a first line, which first line is connected to and downstream of a pump outlet or of a flow control valve, b. Providing a diluent stream in a second line, c. Contacting the first stream and the diluent stream to form a mixed stream and passing the mixed stream to a polymerization reactor, characterised in that the mixing of the first stream and the diluent stream takes place by providing the first stream from the first line and the diluent stream from the second line separately to a mixing chamber which has an enlarged cross-section compared to the first and second lines, and further characterised in that at least one of the following applies:

i) the volume of the mixing chamber is such that the residence time, based on the total volumetric flow rate of the mixed stream, is less than 5 seconds, ii) the volume of the mixing chamber is less than 150 ml, iii) the mixing chamber is not mechanically agitated, iv) the mixing chamber has a cover which can be removed to allow cleaning of the mixing chamber in situ, and further wherein there are provided two or more parallel sets of first line, second line and mixing chamber connecting to the polymerization reactor, such that one mixing chamber can be cleaned whilst continuing to feed catalyst component to the reactor via the second mixing chamber.

22. A process according to claim 21 wherein the first line is connected to and downstream of a pump outlet.

23. A process according to claim 21 wherein the mixing chamber forms a low point for the first stream in the first line.

24. A process according to claim 21 wherein the mixing chamber has a cylindrical cross-section with an internal diameter 2 to 10 times the internal diameter of the first line.

25. A process according to claim 21 wherein the mixing chamber has a cylindrical cross-section with a length to diameter ratio of 0.5 to 10.

26. A process according to claim 21 wherein the mass flow rate of the diluent stream in the second line is 20 to 1000 times the mass flow rate of the first stream in the first line.

27. A process according to claim 21 wherein the first stream comprises a slurry of a polymerization procatalyst.

28. A process according to claim 21 wherein the polymerization reactor is a horizontal stirred bed propylene polymerization reactor.

29. A process for supply of a polymerization catalyst component to a polymerization reactor which comprises:

a. Providing a first stream comprising the catalyst component in a first line, which first line is connected to and downstream of a pump outlet or of a flow control valve, b. Providing a diluent stream in a second line, c. Contacting the first stream and the diluent stream to form a mixed stream and passing the mixed stream to a polymerization reactor, characterised in that the mixing of the first stream and the diluent stream takes place by providing the first stream from the first line and the diluent stream from the second line separately to a mixing chamber which has an enlarged cross-section compared to the first and second lines, and further characterised in that at least one of the following applies:

i) the volume of the mixing chamber is such that the residence time, based on the total volumetric flow rate of the mixed stream, is less than 5 seconds, ii) the volume of the mixing chamber is less than 150 ml, iii) the mixing chamber is not mechanically agitated, iv) the mixing chamber has a cover which can be removed to allow cleaning of the mixing chamber in situ, and further wherein the mass flow rate of the diluent stream in the second line is 20 to 1000 times the mass flow rate of the first stream in the first line.

30. A process according to claim 29 wherein the first line is connected to and downstream of a pump outlet.

31. A process according to claim 29 wherein the mixing chamber forms a low point for the first stream in the first line.

32. A process according to claim 29 wherein the mixing chamber has a cylindrical cross-section with an internal diameter 2 to 10 times the internal diameter of the first line.

33. A process according to claim 29 wherein the mixing chamber has a cylindrical cross-section with a length to diameter ratio of 0.5 to 10.

34. A process according to claim 29 wherein the first stream comprises a slurry of a polymerization procatalyst.

35. A process according to claim 29 wherein the polymerization reactor is a horizontal stirred bed propylene polymerization reactor.

\* \* \* \* \*